United States Patent [19]
Ohba et al.

[11] Patent Number: 5,662,507
[45] Date of Patent: Sep. 2, 1997

[54] HEAT-RESISTANT FELT FOR HOT PRODUCTS

[75] Inventors: Akizo Ohba, Yokohama; Hironori Misawa, Noda; Yukihiro Nomura, Kashiwa, all of Japan

[73] Assignee: Ichikawa Co., Ltd., Tokyo, Japan

[21] Appl. No.: 635,594

[22] Filed: Apr. 22, 1996

[30] Foreign Application Priority Data

Apr. 24, 1995 [JP] Japan .................... 7-123094

[51] Int. Cl.$^6$ .................................................. C08K 7/14
[52] U.S. Cl. .................... 442/320; 442/321; 442/324; 442/387; 442/388; 442/104
[58] Field of Search ........................ 428/300, 301, 428/302, 299, 285, 286, 289; 442/320, 321, 324, 387, 388, 104

[56] References Cited

U.S. PATENT DOCUMENTS

| 4,284,680 | 8/1981 | Awano et al. | 428/234 |
| 4,529,644 | 7/1985 | Awano et al. | 428/284 |
| 4,785,029 | 11/1988 | Honma et al. | 523/154 |
| 4,996,102 | 2/1991 | Kyutoku et al. | 428/285 |

FOREIGN PATENT DOCUMENTS

| 1-33218 | 9/1989 | Japan . |
| 2-8565 | 3/1990 | Japan . |

OTHER PUBLICATIONS

The English translation of JP 2–8565 Mar. 1990.
The English translation of JP 1–33218 Sep. 1989.

*Primary Examiner*—Kathleen Choi
*Attorney, Agent, or Firm*—Howson and Howson

[57] ABSTRACT

The invention provides a heat-resistant felt for hot products which is sufficiently heat-resistant for conveying or placing hot products thereon in manufacturing processes of iron and steel, non-ferrous metal, and ceramics products, and contributes to the improvement of the quality and life of products. A heat-resistant fiber web of a blend or laminate comprising metal fibers and inorganic fibers or a heat-resistant fiber web of a blend or laminate comprising metal fibers or inorganic fibers and heat-resistant organic fibers is needle-punched with or without a heat-resistant ground fabric laminated so as to intermingle.

4 Claims, 3 Drawing Sheets

HEAT-RESISTANT FELT FOR HOT PRODUCTS

FIELD OF THE INVENTION

This invention relates to a heat-resistant felt for hot products suitable for conveying hot products manufactured in the field of iron, non-ferrous metal and ceramic industries, more particularly relates to a heat-resistant felt for hot products suitable for preventing effectively extruded aluminum and copper hot products from being damaged during conveying in a high temperature zone on the surface with flaws, dents, and deterioration (spot flaws), and suitable for use as a material for conveying steel plates in a plating line in the field of steel manufacturing, as a material for conveying plate glass in the ceramic field, as a material for conveying molded products such as reinforced windshields for automobiles, and as a spacer material used in an annealing process for manufacturing rolled products of non-ferrous metal.

BACKGROUND OF INVENTION

Conventionally carbon-molded products have been used as a conveyor material for conveying hot products (aluminum sections) in the rear equipment of aluminum extrusion press machines (aluminum extrusion process). Though the carbon-molded products are excellent in heat-resistance and long life, the carbon-molded products damages aluminum sections in a form of flaws, dents and spot flaws. Especially, the spot flaws are caused from local rapid cooling of aluminum sections, when, molecular structure changes partially to deteriorate the surface (this phenomenon is called as a black spot). This phenomenon is specific to aluminum alloys (serious especially for 6063 alloy), and the high thermal conductivity of the carbon-molded products (10 to 15 kcal/m·hr·°C.) causes the rapid cooling.

To cope with this problem, the inventors of the present invention proposed previously a heat-resistant felt for hot products primarily containing carbon fibers and heat-resistant fibers, for example, "a heat-resistant roll for the rear equipment of aluminum extrusion press machines" (Japanese Utility Model No. 1818591) and "cooling table" (Japanese Utility Model No. 1990726). The heat-resistant felts described in these inventions have thermal conductivity of 0.10 to 0.14 kcal/m·hr·°C., this value is 1/100 or less times that of the above-mentioned carbon-molded products, therefore, these felts do not cause spot flaws.

In the plating line of steel, conventionally conveyor rolls, which are for conveying plated iron plates from a zinc melting vessel (melting point of 420° C.), are wounded with asbestos on the surface, however, because of the environmental health problem of asbestos, recently rolls the outer surface of which roll is covered with a para-aromatic polyamide fiber tube or non-woven fabric rolls have been used. In the manufacturing process of ceramics, especially glass, woven fabrics comprising para-aromatic polyamide fibers are used for conveying glass of about 650° C.

On the other hand, asbestos and mica have been used conventionally in the annealing process of rolling of non-ferrous metals such as aluminum, however, these materials have caused an industrial safety and hygiene problem. In spite of these serious problems, there has been no alternative for these materials.

For a heat-resistant felt for hot products (aluminum sections) discharged from an aluminum extrusion press machine, primarily organic fibers of para-aromatic polyamide fibers or meta-aromatic polyamide fibers alone are used, therefore, the heat-resistance is insufficient at the initial part just after the extrusion press machine where the maximum temperature is 550° C., and the service life of the material is short. To compensate the deficiency in heat resistance, remediations in which water is impregnated in the felt temporarily or the felt is used with carbon-molded products together have been taken, however, these remediations involve troublesome works.

Also in the plating line of iron and the glass manufacturing line para-aromatic polyamide fibers used as a heat-resistant felt is deficient in heat-resistance, therefore, the service life of the felt is short. On the other hand, similarly in the above-mentioned annealing process, the spacer material comprising aromatic polyamide fibers is used at a temperature as high as 350° C. to 550° C., the spacer is thermally decomposed and the service life is short, the short service life being a problem.

It is an object of the present invention in view of the above-mentioned problems in the field of steel, non-ferrous metal and ceramic industries, to provide a heat-resistant felt for hot products excellent in heat-resistance, having long service life, and contributing to the improvement of product quality.

It is another object of the present invention to provide a heat resistant felt for hot products excellent in bonding between fibers, long service life, and dimensional stability. It is a further object of the present invention to provide a heat-resistant felt for hot products excellent in wearing resistance.

SUMMARY OF INVENTION

To attain the objects of the present invention, the hear-resistant felt for hot products in accordance with the present invention is a heat-resistant felt manufactured by needle-punching so as to intermingle a heat-resistant fiber web comprising a blend or laminate of metallic fibers and inorganic fibers, or a blend or laminate of metallic fibers or inorganic fibers, and heat-resistant organic fibers.

In the heat-resistant felt for hot products in accordance with the present invention, a heat-resistant fiber web is needle-punched with a heat-resistant ground fabric. Moreover, in the heat-resistant felt for hot products in accordance with the present invention, a heat-resistant resin may be added after the needle-punching.

Metal fibers (stainless fiber, copper fiber) and inorganic fibers (glass fiber, carbon fiber, ceramic fiber, alumina fiber, and tyrano fiber) have high heat-resistance, therefore, these fibers are used solely for a heat-resistant fiber web, or used for a heat-resistant fiber web in blend or lamination with others. Therefore, these heat-resistant fiber webs are needle-punched so as to intermingle, thus, this product may be used in the initial part of an aluminum extrusion process where the temperature of aluminum sections are about as high as about 550° C.

Heat-resistant fiber webs comprising a blend or laminate in which metal fibers or inorganic fibers, and heat-resistant organic fibers (such as para-aromatic polyamide fiber and meta-aromatic polyamide fiber) are mixed or laminated at a prescribed proportion has also high-heat resistance, by intermingling and unifying these fibers through a needle-punching process, the resultant felt may be used as a heat-resistant felt for hot products. The heat resistant organic fibers may compensate the brittleness of the metal fibers or the inorganic fibers, and also improve the bonding between both fibers.

Further, a web comprising the above-mentioned plurality of heat-resistant fiber types is needle-punched with a heat-resistant ground fabric (woven fabric) to intermingle the web fibers to the ground fabric, thereby, bonding between fibers and dimensional stability may be improved.

By applying a heat-resistant resin (for example, heat-resistant silicone resin, fluororesin, polyimide resin, and tyrano resin) by spraying, coating, or dipping on the web after the needle-punching process, wearing resistance is improved.

EMBODIMENTS

Now, embodiments of the present invention will be described referring to the attached drawings.

Figure 1:
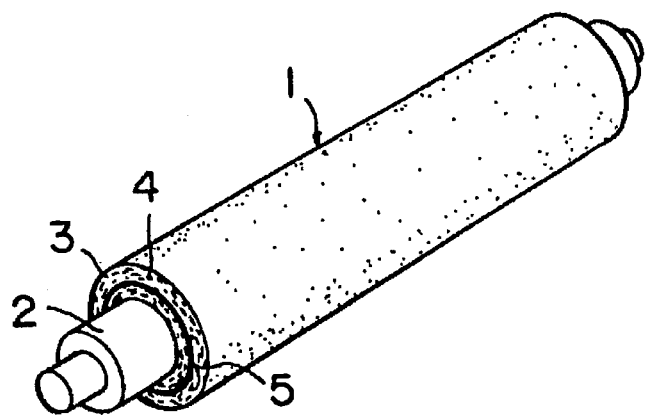
FIG. 1 is a perspective view of a conveyor roll according to the present invention.

A conveyor roll 1 shown in FIG. 1 is used in an initial part of an aluminum extrusion process where the maximum temperature of aluminum sections is as high as about 550° C., the peripheral surface of a metal roll body 2 is covered with a felt 3 of the present invention having a form of a tube.

Figure 2:
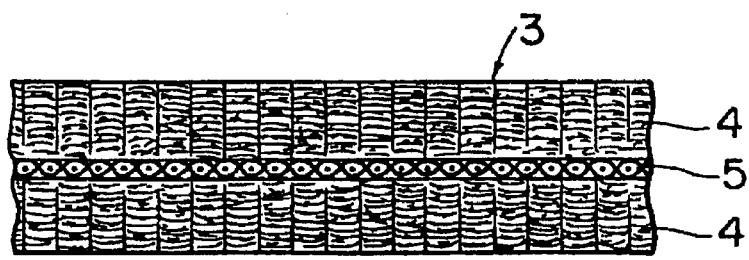
FIG. 2 is an enlarged cross-sectional view of a felt of the present invention.

As shown in FIG. 2, the felt 3 of the present invention is manufactured by needle-punching a heat-resistant fiber web 4 comprising metal fibers solely, inorganic fibers solely, or a blend or laminate containing metal fibers and inorganic fibers with a heat-resistant ground fabric 5 to compactly intermingle.

The heat resistant web 4 of a blend of metal fibers or inorganic fibers with heat-resistant organic fibers (such as para-aromatic polyamide fiber and meta-aromatic polyamide fiber), or of a laminate comprising metal fiber layers or inorganic fiber layers, and heat-resistant organic fiber layers is formed, this web 4 may be needle-punched with the heat-resistant ground fabric 5 to compactly intermingle. In this case, it is desirable that a metal fiber layer or inorganic fiber layer is placed as the outermost layer.

The above-mentioned heat-resistant ground fabric 5 is used for effectively intermingling the fibers, the ground fabric maybe constituted with yarns of heat-resistant para- or meta-aromatic polyamide organic fibers, may be a parallel cloth which is constituted with yarns arranged in parallel each other in the direction to be dimensionally stable, or may be a non-woven fabric which is constituted with a parallel yarn layer and the other parallel yarn layer overlapped one in the longitudinal direction and the other in the cross direction.

Figure 3:
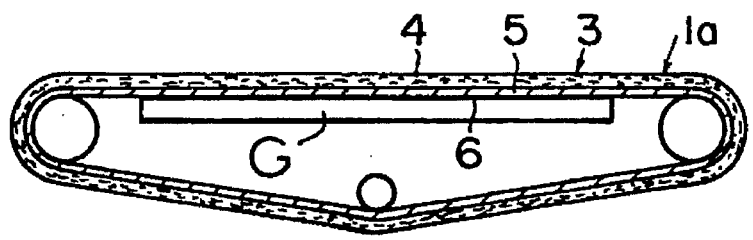
FIG. 3 is a side view of a conveyor belt according to the present invention.

A conveyor belt 1a shown in FIG. 3 is used in the cooling part of an aluminum extrusion process where aluminum sections are kept at a temperature as high as about 350° C. to 480° C. The felt of the present invention 3 used for this place comprises as shown in FIG. 3 a heat-resistant ground fabric 5, a heat-resistant fiber web 4 of metal fibers or inorganic fibers or blend or laminate of these fibers placed on the heat-resistant ground fabric 5 which web is needle-punched with the heat-resistant ground fabric 5 to compactly intermingle, and a wear-resistant resin layer 6 coated on the side which contact with a guide member G.

In the case of this conveyor belt 1a, it is possible to blend heat resistant organic fibers in addition to the metal fibers and the inorganic fibers. Though it is not shown in the figure, naturally, a plurality of ground fabrics 5 may be laminated with the webs alternately in the depth direction of the layer.

Figure 4:
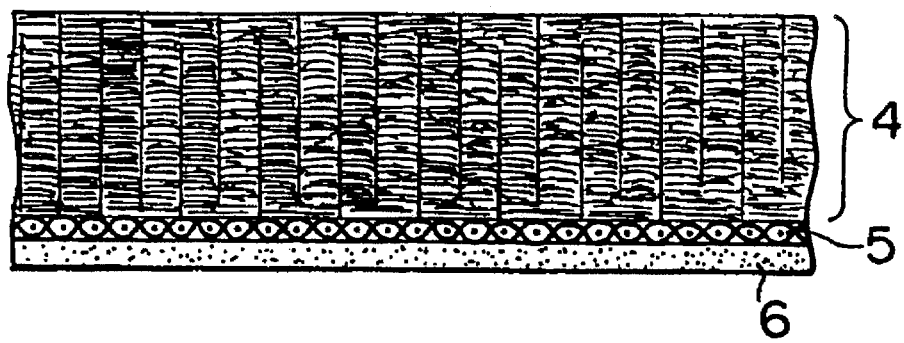
FIG. 4 is an enlarged cross-sectional view of a felt of the present invention which constitutes the belt.
Figure 5:
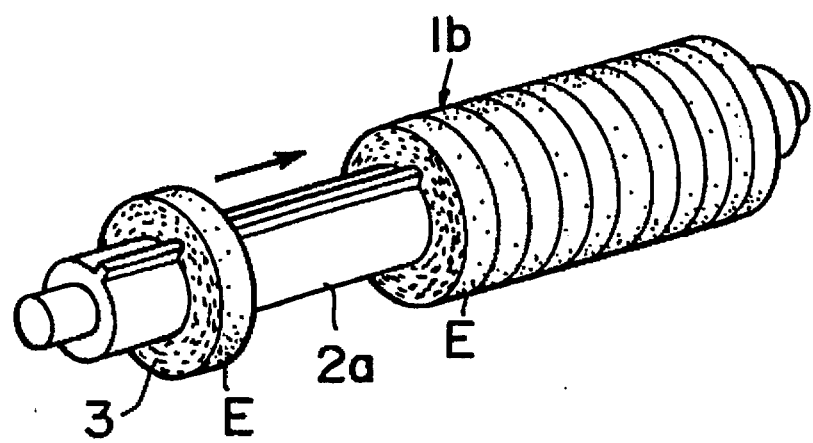
FIG. 5 is a perspective view of a manufacturing process of a non-woven fabric roll.

A non-woven fabric roll 1b shown in FIG. 5 is used in an initial part or runout part of an aluminum extrusion process where the temperature of aluminum sections is as high as about 480° C. to 550° C. In this case, the felt 3 of the present invention contains no heat-resistant ground fabric 5 as shown FIG. 2 and FIG. 4 but contains only the heat-resistant fiber web 4 of metal fibers solely, or inorganic fibers solely, or a blend or laminate of these fibers which is needle-punched so as to intermingle.

Figure 6:
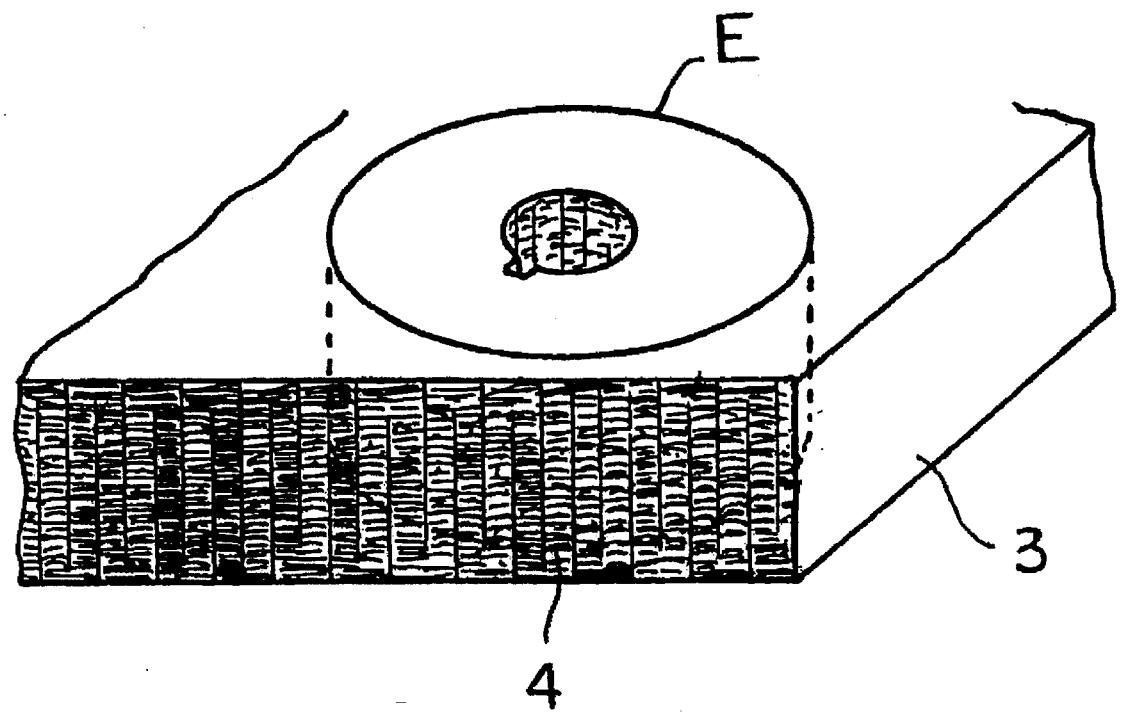
FIG. 6 is an enlarged perspective view of a felt of the present invention which constitutes the roll elements of the roll.

In detail, the above-mentioned non-woven fabric roll 1b is fabricated by arranging in the axial direction roll elements E punched from the felt 3 of the present invention as shown in FIG. 6 along a metal roll 2a with a key as shown in FIG. 5, and pressing it from the both side ends. The layered cross-sections of the felt 3 of the present invention appears on the surface of the non-woven fabric roll 1b. If a heat-resistant ground fabric is used in the web, the ground fabric layers with different hardness is exposed on the surface of the non-woven fabric roll 1b.

The rate of the needle-punching, the thickness and weight per area of entire layer including the heat-resistant ground fabric 5 after intermingling are prescribed in view of a practical use condition. In view of an actual use condition, a heat-resistant resin such as silicone resin, fluororesin, polyimide resin, and tyrano resin is applied on the heat-resistant fiber web 4 after needle-punching by spraying, coating, or dipping. A resin is applied to improve the wear-resistance of the felt. The resin content to be effective for wear-resistance is determined by wearing tests described hereinafter.

Figure 7A:
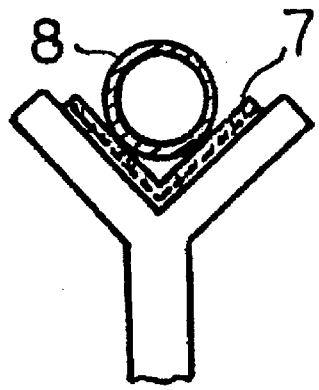
FIGS. 7(a) and (b) are example use of a spacer material in an annealing process of an aluminum rolling process, wherein (a) is for rods and (b) is for flat plates.
Figure 7B:
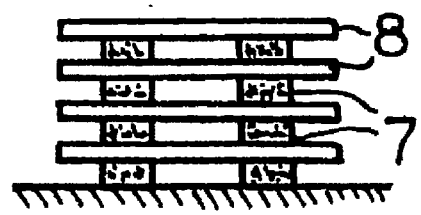

A spacer material 7 shown in FIG. 7 is used in an annealing process of a rolled product of non-ferrous metal. The spacer material 7 is manufactured by needling a heat-resistant fiber web comprising metal fibers or inorganic fibers or a heat-resistant fiber web comprising a blend or laminate of inorganic fibers and organic fibers such as meta-aromatic polyamide fibers to compactly intermingle. Actual examples of this spacer material will be described hereinafter.

Next, heat-resistant fiber webs containing three types of fibers in the following forms (a) to (c) were needle-punched with a rate of 3000 to 3300 needles/cm$^2$ to obtain felts of the present invention (thickness of 6 to 7 mm, weight of 2500 to 3000 g/m$^2$, fiber diameter of glass fibers of 5μ, fiber diameter of stainless fibers of 12μ, para-aromatic polyamide fibers [trade name Kevlar] 1.5 d), and these felts were subjected to wearing tests. For testing, the samples were heated at 350° C. for 3 hrs, and then, using a Taber type wearing tester with weight of 500 g and wearing ring equivalent to H-18, the samples were subjected to the wear test 2000 times and the wear loss was measured. The result is shown in Table 1.

(a) Para-aromatic polyamide fiber 100%;

(b) Glass fiber 60% and para-aromatic polyamide fiber 40% blended; and (c) Glass fiber 80% and para-aromatic polyamide fiber 20% blended.

TABLE 1

| (Felt composition) | (Wear loss) | (Comparision of wear loss) |
| --- | --- | --- |
| (a) Para-aromatic polyamide: 100% | 1.95 g | 1 |
| (b) Glass:para-aromatic polyamide: 60:40 | 1.30 g | 0.67 |
| (c) Glass:para-aromatic polyamide: 80:20 | 1.75 g | 0.90 |

As the result of the test, it has been found that the blending or compositing of glass fibers with para-aromatic polyamide fibers results in improved heat-resistance of the resultant felt and reduced wear loss to 0.67 to 0.90 comparing with the case of a para-aromatic polyamide fiber 100% to which the reference value "1" has been given. The wear loss is attributed to thermal deterioration of fibers of the felt.

As the result of the test, it has been found that the optimal blend ratio of glass fibers and para-aromatic polyamide fibers is 60:40, the increased proportion of glass fibers results in loose intermingling of the fibers, and the loose intermingling results in increased wear loss. On the contrary, the increased proportion of para-aromatic polyamide fibers in the blend results in improved intermingling of the fibers, however, simultaneously results in reduced heat resistance, thus, the wear loss due to thermal deterioration increases.

In detail, it has been proven that, in case a felt is manufactured by needle-punching glass fibers and inorganic fibers so as to intermingle, a web comprising glass fibers solely or inorganic fibers solely or comprising primarily these fibers results in loose intermingling, and the blending or laminating of organic fibers such as para-aromatic polyamide fibers is effective to improve the intermingling.

Next, a felt having the felt composition of the above-mentioned (b) which gave the best result (blend of glass fibers and para-aromatic polyamide fibers 60:40) in the wearing test described herein-above was added with a heat-resistant silicone resin by impregnating and hardening. Obtained samples containing 5%, 10% and 15% resin, respectively, these samples were subjected to the wearing test as described herein above. The result is shown in Table 2.

TABLE 2

| (Resin content) | (Wear loss) | (Comparison of wear loss) |
| --- | --- | --- |
| 0 | 1.85% | 1 |
| 5% | 0.57% | 0.31% |
| 10% | 0.65% | 0.35% |
| 15% | 0.95% | 0.51% |

From the result in Table 2, it has been found that the dipping and hardening of the heat-resistant resin results in improved wear-resistance, thus wear loss is reduced to 0.31 to 0.51 based on the reference value "1" of untreated resin. However, wear loss increases with the increase of resin content, therefore, it suggests that wear of resin itself is included in the wear loss.

From the above wearing test, it has been confirmed that about 5% resin content is effective for wear-resistance, more content of resin causes increased wear loss. However, the present invention should not be limited to the composition and content described in the above-mentioned tests, the condition may be changed depending on applications.

EXAMPLE 1

A heat-resistant fiber web comprising 100% para-aromatic polyamide fibers was needle-punched so as to intermingle and a heat-resistant felt (comparative felt) with a weight of 4000 g/m² and a thickness of 10.0 mm was obtained, and also a heat-resistant fiber web comprising a blend of 60% of glass fibers and 40% of para-aromatic polyamide fibers was needle-punched so as to intermingle and a heat-resistant felt (felt of the present invention) with a weight of 4000 g/m² and a thickness of 10.0 mm was obtained.

These two felts were cut to a size of 60 mm×450 mm, and 150 pieces of each felt were mounted on an actual conveyor to evaluate in actual use. The used machine is a 2750 ton extrusion press machine, and the felt was mounted on the runout part of the slat conveyor, in detail, on each slat bar of the conveyor one piece of the felts was placed, therefore, total 150 pieces were placed, so that the felt pieces contact with aluminum sections evenly, when the extrusion speed was synchronized with the slat conveyor.

Extruded aluminum sections with an arbitrary shape have a unit weight of 3.5 kg/m in average, and only an air cooling fan was used for cooling the aluminum sections. The temperature of the aluminum sections which was in contact with the felt mounted on the slat conveyor was estimated to be 350° C. to 480° C. The machine was operated continuously 24 hrs per day.

The two felts were used under the above-mentioned condition, as the result, the comparative felt containing 100% para-aromatic polyamide fibers was worn fast at the contact portion with the aluminum sections and after use of about 30 days the felt was damaged beyond the use. On the other hand, the felt of the present invention containing a blend of 60% of glass fibers and 40% of para-aromatic polyamide fibers could be used for about 40 to 50 days. Of course, no abnormal black spot on the aluminum sections which is usually caused by the contact with the heat-resistant felt was not found in the operation.

A heat-resistant resin (silicone resin) was contained in the above-mentioned felt of the present invention in content of 3% to 30% by impregnating or coating, and these felts are used under the same condition as described in the above-mentioned operation, it was found that the felt with a resin content of 25% or less gave more improved wear-resistance and could be used for 60 to 75 days.

The felts with a resin content of exceeding 25% resulted in increased felt wear loss because of increased wear loss of the resin, and it was found that the increased resin content not necessarily resulted in improved wear-resistance.

EXAMPLE 2

A heat-resistant fiber web comprising 100% of para-aromatic polyamide fibers was needle-punched to compactly intermingle, and a heat-resistant felt (comparative felt) with a weight of 4000 g/m² and a thickness of 10.0 mm was obtained, and also, a heat-resistant fiber web comprising a blend of 60% of glass fibers and 40% of para-aromatic polyamide fibers was needle-punched to compactly intermingle, and a heat-resistant felt (felt of the present invention) with a weight of 4000 g/m² and a thickness of 10.0 mm was obtained. Two heat-resistant felt belts for the cooling part of an aluminum extrusion process were manufactured using the two heat-resistant felts individually. The size of the belt was 95 mm width, 7780 mm length and 12 mm thickness.

The two types of belts were used on an actual machine for evaluation. For evaluation, a 1800 ton extrusion press machine having an attachment chain type cooling table was used, the ten belts were mounted with a 1200 mm pitch from the extrusion press machine so that the felts were in contact with aluminum sections evenly.

Extruded aluminum sections with an arbitrary shape have a unit weight of 2 kg/m in average, and the number of sections conveyed on the belt was 7 to 12. An air cooling fan was used to cool the aluminum sections. The maximum temperature of the aluminum sections in contact with the above-mentioned belts during conveying was estimated to be about 450° C., and cooled down to the minimum temperature of about 200° C. The operational test was continued 24 hrs per day.

Under the above-mentioned service condition, the comparative felt containing 100% of para-aromatic polyamide fibers decreased gradually in the thickness and the thickness was reduced to 6.0 mm (residual thickness percentage of 50%) after two years in service because of the synergistic action of deterioration due to heat of sections and wear due to contact on the felt surface. On the other hand, the felt of the present invention comprising the blend of 60% of glass fibers and 40% of para-aromatic polyamide fibers decreased more gradually in thickness and the thickness was reduced to about 8.0 mm (residual thickness percentage of 67%) after the same two years in service.

These felt belts were put into further use, then the above-mentioned belt having the heat-resistant felt comprising the web including 100% of para-aromatic polyamide fibers decreased further in thickness with wear, and damaged so as to be non-usable after about three years in service because of damages and deterioration of the belt due to heat. On the other hand, the belt of the present invention comprising the heat-resistant felt having the blend web containing glass fibers was used stably for a longer period of time and damaged so as to be non-usable only after about 3.5 to 4 years in service.

EXAMPLE 3

A heat-resistant fiber web comprising 100% of para-aromatic polyamide fibers was needle-punched to compactly intermingle, and a heat-resistant felt (comparative felt) with a weight of 2000 g/m$^2$ and a thickness of 2 mm was obtained, also a heat-resistant felt comprising a heat-resistant fiber web including 100% of stainless steel fibers with the same quality (felt (1) of the present invention) and another heat-resistant felt comprising a heat-resistant fiber web including 60% of glass fibers and 40% of para-aromatic polyamide fibers with the same quality (felt (2) of the present invention) were obtained similarly. These three types of felts were punched to prepare roll elements E for non-woven fabric rolls as shown in FIG. 5, and non-woven fabric rolls 1b comprising these three types of felts were obtained individually. The outside diameter, length and surface hardness of the rolls were 60 mm, 300 mm and 85°±5° with a JIS-C type hardness meter, respectively.

These three types of rolls were used for evaluation on an actual machine. A 2000 ton extrusion press machine was used for evaluation, on the initial part (total length of 5 m) of the machine, the 15 above-mentioned non-woven rolls were in contact with aluminum sections evenly with a 300 mm pitch from just after the extrusion press machine, when the speed of the non-woven rolls was synchronized with the extrusion speed. The extruded aluminum sections with an arbitrary shape had a unit weight of 2 kg/m in average. An air cooling fan and water cooling shower were used to cool the aluminum sections. The temperature of the aluminum sections in contact with the non-woven fabric rolls was estimated to be 480° C. to 550° C. The test was continuously operated 24 hrs per day.

As the result of the actual use test under the above-mentioned condition, the above-mentioned non-woven fabric rolls provided with the reference felt comprising 100% of para-aromatic polyamide fibers were worn gradually during the use and damaged so as to be non-usable after about six months in service because of wear of the rolls at the contact portion with the aluminum sections. On the other hand, the non-woven fabric rolls provided with the blend felt (2) of the present invention comprising 60% of glass fibers and 40% of para-aromatic polyamide fibers withstood the use for about 10 months.

The non-woven fabric rolls provided with the felt (1) of the present invention comprising 100% of stainless steel fibers could be used for about 24 months. Of course, during the period in service, no abnormal flaws, dints and black spots on the aluminum sections due to the non-woven fabric rolls were found.

Based on the results of Examples 1 to 3 described herein above, for the conveyor material used in hot areas of an aluminum extrusion process from the initial part to the cooling part, it was proven that a heat-resistant felt blended with metal fibers and inorganic fibers has excellent heat-resistance and wear-resistance or longer life comparing with conventional heat-resistant felts.

Next, a heat-resistant fiber web comprising 100% of para-aromatic polyamide fibers was needle-punched to compactly intermingle, and a tubular heat-resistant felt (comparative felt) with a weight of 4000 g/m$^2$ was obtained, on the other hand, a heat-resistant fiber web comprising a blend of 60% of glass fibers and 40% of para-aromatic polyamide fibers was needle-punched to compactly intermingle, and a tubular heat-resistant felt (felt of the present invention) with a weight of 2000 g/m$^2$ was obtained. These felts were applied on the top roll of a plating line to use. The temperature of the plating plates was 380° C.

The life of the comparative felt comprising 100% of para-aromatic polyamide fibers was 20 days, on the other hand, the life of the felt of the present invention comprising 60% of glass fibers and 40% of para-aromatic polyamide fibers was 36 days, namely 180% improved life.

Next, the comparison of a spacer of the present invention with a conventional asbestos spacer is described for the annealing process of an aluminum rolling process. A heat-resistant fiber web comprising a blend of 70% of carbon fibers and 30% of meta-aromatic polyamide fibers was placed-on a ground fabric comprising glass fibers, and the laminate was needle-punched to form a felt of the present invention with a thickness of 4.5 mm. The felt of the present invention was used for 8 hrs in an inert gas at 350° C. The felt of the present invention was used without dust generation.

Stainless steel fiber webs and ground fabrics comprising glass fibers were laminated alternately and the laminate was needle-punched to compactly intermingle, and the felt of the present invention with a thickness of 8 mm was obtained, then, the felt was used in the annealing process at 550° C. The life was 30 days for the felt of the present invention, on the other hand, the life was only 10 days for the asbestos product.

ADVANTAGES OF INVENTION

As described hereinbefore, the present invention provides a felt which is manufactured by needle-punching a heat-resistant fiber web of a composite or laminate comprising metal fibers and inorganic fibers, or of a composite or laminate comprising metal fibers or inorganic fibers, and heat-resistant organic fibers so as to intermingle, and then the felt of the present invention can be successfully used at hot places such as the initial part of an aluminum extrusion process where the temperature of the aluminum sections reaches as high as about 550° C.

The present invention provides a felt which is manufactured by needle-punching the above-mentioned heat-resistant fiber web and a heat-resistant ground fabric together, the resultant felt has improved bonding between the fibers and improved wear-resistance, and further, the felt of the present invention does not cause flaws or black spots on the surface of soft hot products just formed in the manufacturing process of iron, non-ferrous metal and ceramics industries. The heat-resistant ground fabric (heat-resistant woven fabric) provides improved dimensional stability and longer life to the products.

Also, the addition of a heat-resistant resin on a heat-resistant fiber web after needle-punching results in more improved service life and heat-resistance.

What is claimed:

1. A heat-resistant felt for hot products manufactured by needle-punching so as to compactly intermingle a heat-resistant fiber web comprising a blend of glass fibers and para-aromatic polyamide fibers at a ratio of 60:40.

2. A heat-resistant felt for hot products as claimed in claim 1, wherein said heat-resistant fiber web is needle-punched with a heat-resistant ground fabric.

3. A heat-resistant felt for hot products as claimed in claim 1, wherein a heat-resistant resin is added after said needle-punching.

4. A heat-resistant felt for hot products as claimed in claim 2, wherein a heat-resistant resin is added after said needle-punching.

* * * * *